United States Patent
Satou et al.

(10) Patent No.: US 7,166,841 B2
(45) Date of Patent: Jan. 23, 2007

(54) OBJECT DETECTION APPARATUS, ESPECIALLY FOR VEHICLES

(75) Inventors: Masanori Satou, Atsugi (JP); Kazutaka Mizoguchi, West Bloomfield, MI (US)

(73) Assignee: Nissan Motor Co., Ltd., Yokohama (JP)

( * ) Notice: Subject to any disclaimer, the term of this patent is extended or adjusted under 35 U.S.C. 154(b) by 24 days.

(21) Appl. No.: 11/175,397

(22) Filed: Jul. 7, 2005

(65) Prior Publication Data
US 2006/0197019 A1    Sep. 7, 2006

(30) Foreign Application Priority Data
Jul. 7, 2004    (JP) .............................. 2004-200378

(51) Int. Cl.
*G01J 5/00*    (2006.01)
(52) U.S. Cl. ................................ 250/338.1; 250/336.1
(58) Field of Classification Search ............ 250/338.1, 250/336.1, 339.02
See application file for complete search history.

(56) References Cited

U.S. PATENT DOCUMENTS

| | | | |
|---|---|---|---|
| 3,897,150 A | | 7/1975 | Bridges et al. |
| 4,902,126 A | * | 2/1990 | Koechner .................. 356/5.08 |
| 5,200,793 A | | 4/1993 | Ulich et al. |
| 5,313,262 A | * | 5/1994 | Leonard .................... 356/4.01 |
| 5,371,581 A | * | 12/1994 | Wangler et al. ............ 356/5.01 |
| 5,504,480 A | * | 4/1996 | Bourbin ...................... 340/903 |
| 5,529,138 A | * | 6/1996 | Shaw et al. ................. 180/169 |
| 5,764,785 A | | 6/1998 | Jones et al. |
| 6,370,475 B1 | * | 4/2002 | Breed et al. ................ 701/301 |
| 6,891,563 B2 | | 5/2005 | Schofield et al. |
| 2005/0024494 A1 | | 2/2005 | Hirota et al. |
| 2005/0025345 A1 | | 2/2005 | Ohta et al. |

FOREIGN PATENT DOCUMENTS

EP    0479273    4/1992
JP    H05-11052 A    1/1993

* cited by examiner

*Primary Examiner*—David Porta
*Assistant Examiner*—Mark R. Gaworecki
(74) *Attorney, Agent, or Firm*—Global IP Counselors, LLP (57) ABSTRACT

An object detection apparatus has a laser radar and near infrared ray projector. The projector has a near infrared ray projecting lens, a laser oscillator, a laser receiver and a swivel actuator. The laser oscillator emits a laser beam, while the swivel actuator scans the laser beam in a laser scanning range. A laser receiver receives the laser beam reflected on an object. The near infrared ray projecting lens diverges the laser beam and projects a near infrared ray into a range including the laser scanning range and a near infrared ray projecting range. The near infrared camera obtains an infrared image by receiving a near infrared ray reflected on the object. An electronic control unit calculates object information based on the received laser beam when detecting an object and causes the near infrared ray to be projected to obtain the infrared image when acquiring the infrared image.

20 Claims, 4 Drawing Sheets

OBJECT DETECTION APPARATUS, ESPECIALLY FOR VEHICLES

CROSS-REFERENCE TO RELATED APPLICATIONS

This application claims priority under 35 U.S.C. § 119 to Japanese Patent Application No. 2004-200378. The entire disclosure of Japanese Patent Application No. 2004-200378 is hereby incorporated herein by reference.

BACKGROUND OF THE INVENTION

1. Field of the Invention

The present invention generally relates to an object (obstacle) detection apparatus, especially suitable for vehicle. More specifically, an object (obstacle) detection apparatus such an infrared ray projector and an infrared imaging apparatus that can be used with a vehicle for obtaining an infrared image by projecting a near infrared ray to detect surrounding obstacles and detecting a reflection of the near infrared ray.

2. Background Information

Conventionally, there is a known technology of detecting the direction and traveling speed of an object on a thermal image by combining thermal image information with information from a laser radar. An example of this conventional technology is disclosed in Japanese Patent Laid-Open Publication No. 5-11052. In this publication, in order to present the traveling direction and speed of a specific obstacle in the thermal image, the vehicle-mounted detection apparatus acquires the thermal image by using an infrared imaging apparatus having a far infrared camera that detects the position of the obstacle by using a laser radar system and a scanner.

In this type of vehicle-mounted obstacle detection apparatus, the far infrared detection range of the infrared imaging apparatus is set to the same range as the scanning range of the laser radar system and the scanner. Thereafter, when the position of the obstacle in the thermal image coincides with a scan angle of the laser radar, the vehicle-mounted obstacle detection apparatus calculates the traveling direction and speed of the obstacle on the time series on the basis of information on the distance to the obstacle, which has been obtained by the laser radar system, and the vehicle speed of the driver's vehicle. Thereby, the vehicle-mounted obstacle detection apparatus has displayed the obstacle, the distance to the obstacle, and the traveling direction and speed on the thermal image.

In view of the above, it will be apparent to those skilled in the art from this disclosure that there exists a need for an improved infrared ray projector and/or an improved infrared imaging apparatus that can be used with a vehicle. This invention addresses this need in the art as well as other needs, which will become apparent to those skilled in the art from this disclosure.

SUMMARY OF THE INVENTION

The aforementioned vehicle-mounted obstacle detection apparatus described in Japanese Patent Laid-Open Publication No. 5-11052 is predicated on detecting a thermal image that does not require an infrared ray projector. Thus, there is a need for detecting a far infrared ray from an object and thereby a very expensive far infrared detector has to be mounted on the vehicle-mounted obstacle detection apparatus. Therefore, it has been a cause of an expensive system as a whole.

On the other hand, even if a nightscope system having a relatively inexpensive infrared imaging apparatus for detecting a near infrared ray is used, it requires a near infrared ray projector. Therefore, it takes costs of both the near infrared ray projector and the near infrared detector. Moreover, it has required high power consumption, which is necessary for the near infrared ray projector.

The present invention was contrived in view of the foregoing situations. One object of the present invention is to provide an object detection apparatus capable of acquiring an infrared image at a low price and low power consumption. The object detection apparatus can be an apparatus such as an infrared ray projector or an infrared imaging apparatus, that is capable of be installed in a vehicle.

In order to achieve the above mentioned objects and other objects of the present invention, an object detection apparatus is provided that preferably at least comprises a laser beam emitting device, a laser beam scanning device and an infrared ray projecting device. The laser beam emitting device is configured and arranged to emit a laser beam with a wavelength region including a near infrared ray. The laser beam scanning device is configured and arranged to control a laser beam emitting angle of the laser beam emitting device to scan the laser beam within an object detection range. The infrared ray projecting device is configured and arranged to diverge the laser beam emitted from the laser beam emitting device and project the near infrared ray into an infrared imaging range.

An infrared ray projector according to the present invention comprises laser beam emitting device for emitting a laser beam in a wavelength region including the near-infrared region and laser beam scanning device for controlling a laser beam emitting angle of the laser beam emitting device in such a way as to scan a laser beam within a given object detection range, wherein the infrared ray projecting device diverges the laser beam emitted from the laser beam emitting device and projects a near infrared ray into an infrared imaging range for the infrared imaging device in order to project the near infrared ray received by the infrared imaging device to an object, whereby the above problem is resolved.

An infrared imaging apparatus according to the present invention comprises laser beam emitting device for emitting a laser beam, laser beam scanning device for controlling a laser beam emitting angle of the laser beam emitting device in such a way as to scan the laser beam within a given object detection range, laser beam receiving device for receiving a laser beam scanned by the laser beam scanning device and reflected on an object, infrared ray projecting device for diverging the laser beam emitted from the laser beam emitting device and projecting a near infrared ray into the infrared imaging range for the infrared imaging device, and infrared imaging device for receiving a near infrared ray projected by the infrared ray projecting device and reflected on an object and taking an infrared image. The infrared imaging apparatus resolves the above problem by using control device to control the laser beam scanning device to scan the laser beam and to calculate the object information based on the laser beam received by the laser beam receiving device when detecting the object or to control the infrared ray projecting device to project the near infrared ray and the infrared imaging device to take the infrared image when acquiring the infrared image.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
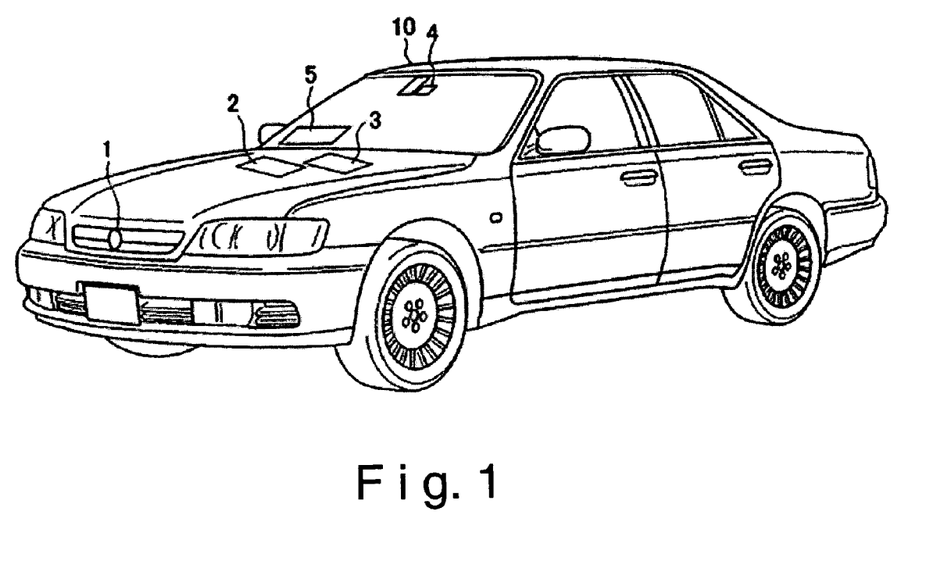
FIG. 1 is a perspective view of a vehicle equipped with a vehicle-mounted obstacle detection apparatus in accordance with one application of the present invention.

Referring initially to FIG. 1, a driver's vehicle 10 is illustrated that is equipped with an obstacle detection apparatus in accordance with a first embodiment of the present invention. For example, as shown in FIG. 1, the obstacle or object detection apparatus basically includes a laser radar and near infrared ray projector 1, a graphic generation section 2 and an electronic control unit (ECU) 3 on an instrument panel, a near infrared camera (infrared imaging device) 4 at the upper portion of a windshield, and a graphic display unit 5 in a driver's visible range with a display section at the lower portion of the windshield. The obstacle detection apparatus is schematically illustrated in more detail in FIG. 2. The obstacle detection apparatus adopts a near infrared ray system for obtaining images around the vehicle 10 and presenting the detected images to a driver or the like. Specifically, the obstacle detection apparatus obtaining images around the vehicle 10 with the near infrared camera 4 and presenting the detected images to a driver or the like on the graphic display unit 5. The near infrared camera 4 is configured to take an image from light reflected on an obstacle similarly to a normal CCD camera or the like, thus requiring a light source during night driving of the vehicle 10. Therefore, the obstacle detection apparatus also has the laser radar and near infrared ray projector 1 as a mechanism for emitting a near infrared ray.

As explained below, the obstacle or object detection apparatus according to the present invention is configured and arranged such that an infrared ray is projected into the near infrared imaging range by diverging a laser beam for acquiring information to detect an object. Therefore, there is no need to provide a dedicated device for projecting the infrared ray into the near infrared imaging range. This enables an acquisition of an infrared image at a low cost and low power consumption.

The near infrared ray has a wavelength invisible to the human eye, and thus, cannot be identified by a driver or the like. On the other hand, the sunlight or the light emitted from the vehicle head lights mounted on the vehicle 10 includes not only visible light, but near infrared rays. Therefore, to detect an obstacle using the near infrared camera 4, the vehicle head lights need to emit a light of extremely high intensity, which causes an oncoming vehicle inconvenience. To cope with this, the obstacle detection apparatus of the present invention is equipped with the laser radar and near infrared ray projector 1 that emits rays having wavelengths in the near infrared region at high intensities, but not including the wavelengths in the visible region.

Figure 2:
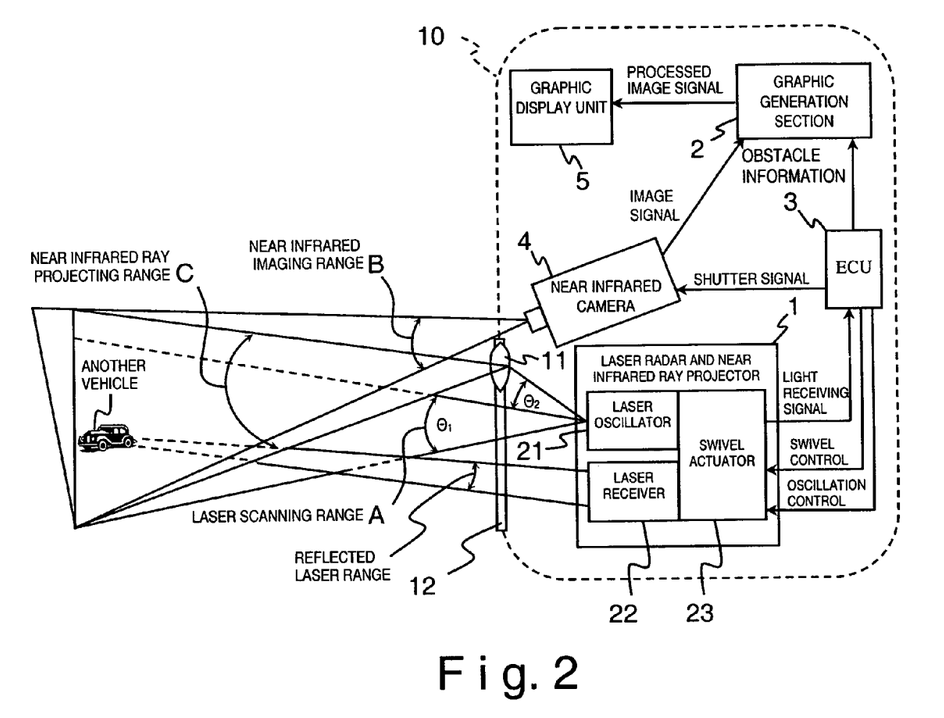
FIG. 2 is a block diagram showing a configuration of the vehicle-mounted obstacle detection apparatus in accordance with the present invention.

As shown in FIG. 2, the body of the vehicle 10 is provided with a near infrared ray projecting lens (infrared ray projecting device) 11 and a near infrared ray transmission bandpass filter 12. The near infrared ray projecting lens 11 and the near infrared ray transmission bandpass filter 12 are provided in the positions on which a laser beam is incident from the laser radar and near infrared ray projector 1, as described later. The near infrared ray projecting lens 11 has such an optical design as diverging and projecting the laser beam from the laser radar and near infrared ray projector 1.

In the obstacle detection apparatus, as shown in FIG. 2, the electronic control unit 3 is operatively connected to the laser radar and near infrared ray projector 1, the near infrared camera 4, and the graphic generation section 2 with the graphic display unit 5 operatively connected to the graphic generation section 2. The obstacle detection apparatus uses the electronic control unit 3 to control the laser radar and near infrared ray projector 1, the graphic generation section 2, the near infrared camera 4, and the graphic display unit 5 to display an infrared image and obstacle information on the graphic display unit 5.

The laser radar and near infrared ray projector 1 emits a laser beam for detecting an obstacle position such as another vehicle existing ahead of the vehicle 10 and emits a near infrared ray, which is received by the near infrared camera 4. As shown in FIG. 2, the laser radar and near infrared ray projector 1 basically includes a laser oscillator 21 (laser beam emitting device), a laser receiver (laser beam receiving device) 22 and a swivel actuator 23. The laser oscillator 21 is configured and arranged to emit a laser beam in the forward direction of the vehicle 10. The laser receiver 22 is configured and arranged to receive a reflected laser beam from the obstacle ahead of the vehicle 10. The swivel actuator 23 (laser beam scanning device) is configured and arranged to control an emitting angle of the laser oscillator 21.

The laser oscillator 21 normally emits a laser beam having a single wavelength in the near infrared region 800 nm to 900 nm. The laser beam emitting angle of the laser oscillator 21 is controlled by the swivel actuator 23. The laser oscillator 21 functions as a laser light source for detecting the obstacle ahead of the vehicle 10 and as an infrared ray projector for displaying an infrared image by using the near infrared camera 4.

When detecting the obstacle ahead of the vehicle 10, the laser oscillator 21 is controlled by the swivel actuator 23 so as to scan a laser beam within a given range of a laser beam emitting angle (laser scanning range) θ1 laterally. Moreover, the laser beam emitting angle is vertically movable. Thereby, the laser oscillator 21 scans a laser beam vertically and laterally in the forward direction of the vehicle 10 through the near infrared ray transmission bandpass filter 12.

When emitting a near infrared ray detected by the near infrared camera 4, the laser oscillator 21 is controlled by the swivel actuator 23 so as to emit a laser beam with the laser beam emitting angle shown in FIG. 2 tilted upwardly by θ2. Thereby, the laser oscillator 21 diverges the near infrared ray in the forward direction of the vehicle 10 through the near infrared ray projecting lens 11. During this time, the swivel actuator 23 stops the lateral scanning.

The swivel actuator 23 enters an oscillation control signal and a swivel control signal from the electronic control unit 3. The swivel actuator 23 controls a time period for scanning a laser beam using the laser oscillator 21 on the basis of the oscillation control signal. Moreover, the swivel actuator 23 scans a laser beam within the scanning range of the laser beam emitting angle θ1 and/or emits a laser beam at the laser beam emitting angle θ2 on the basis of the swivel control signal.

The laser receiver 22 receives a laser beam that has been emitted from the laser oscillator 21, passed through the near infrared ray transmission bandpass filter 12, and been reflected on the obstacle ahead of the vehicle 10, and thereby detects a light receiving signal. The light receiving signal is supplied to the electronic control unit 3. The electronic control unit 3 controls a time period for detecting the light receiving signal and a time period for canceling the light receiving signal.

The near infrared camera 4 receives a near infrared ray reflected in the area ahead of the vehicle 10 after the laser beam emitted from the laser oscillator 21 is diverged by the near infrared ray projecting lens 11. The near infrared camera 4 is adapted to receive a near infrared ray of 780 nm to 1000 nm, for example, and to receive at least near infrared rays having wavelengths of laser beams emitted from the laser oscillator 21.

The near infrared camera 4 receives a shutter signal from the electronic control unit 3. The shutter signal is used to control the light receiving timing of a near infrared ray, namely the imaging timing of an infrared image. Then, the near infrared camera 4 outputs an image signal to the graphic generation section 2, which controlled by the electronic control unit 3. Thus, this image signal from the near infrared camera 4 produces the infrared image that is sent to the graphic generation section 2.

The electronic control unit 3 preferably includes a microcomputer with a control program that controls the laser radar and near infrared ray projector 1, the graphic generation section 2 and the near infrared camera 4 as discussed below. The electronic control unit 3 also includes other conventional components such as an input interface circuit, an output interface circuit, and storage devices such as a ROM (Read Only Memory) device and a RAM (Random Access Memory) device that are needed and/or desired to carry out the present invention. It will be apparent to those skilled in the art from this disclosure that the precise structure and algorithms for electronic control unit 3 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The electronic control unit 3 is configured and arranged to control the laser radar and near infrared ray projector 1 and the imaging timing of the near infrared camera 4 to detect obstacles, such as another vehicle, in the vicinity of the vehicle 10. The electronic control unit 3 is further configured and arranged to calculate obstacle information based on the signals from the laser radar and near infrared ray projector 1 and the imaging timing of the near infrared camera 4. For acquiring obstacle information including an obstacle position, the electronic control unit 3 outputs an oscillation control signal as an instruction for emitting a laser beam from the laser oscillator 21 and a swivel control signal as an instruction for scanning the laser beam at the laser beam emitting angle θ1. Thereby, the electronic control unit 3 acquires the light receiving signal of the laser beam received by the laser receiver 22 due to the reflection of the laser beam on an obstacle after the laser beam is scanned through the near infrared ray transmission bandpass filter 12. Then, the electronic control unit 3 determines the presence or absence of an obstacle, the direction of any such obstacle to the vehicle 10, and a distance from the vehicle 10 to any such obstacle, and then outputs this information as obstacle information to the graphic generation section 2.

When controlling the near infrared camera 4 to obtain an infrared image, the electronic control unit 3 supplies a shutter signal to the near infrared camera 4 in synchronization with the supply of the swivel control signal for emitting the laser beam toward the near infrared ray projecting lens 11 from the laser oscillator 21 to the swivel actuator 23. This causes the near infrared ray diverged by the near infrared ray projecting lens 11 to be received by the near infrared camera 4 without fail. The electronic control unit 3 can calculate obstacle information from the light receiving signal having been acquired before.

The graphic generation section 2 receives an infrared image from the near infrared camera 4 and obstacle information from the electronic control unit 3. The graphic generation section 2 creates a display image by overlapping the obstacle information with the infrared image, and outputs it as an image signal to the graphic display unit 5.

The graphic display unit 5 preferably includes a head-up display, for example, and displays the infrared image and the obstacle information to an occupant (driver and/or passenger) by performing a display action using the image signal from the graphic generation section 2.

The following describes a laser scanning range, a near infrared imaging range, and a near infrared ray projecting range in the aforementioned obstacle detection apparatus.

Figure 3:
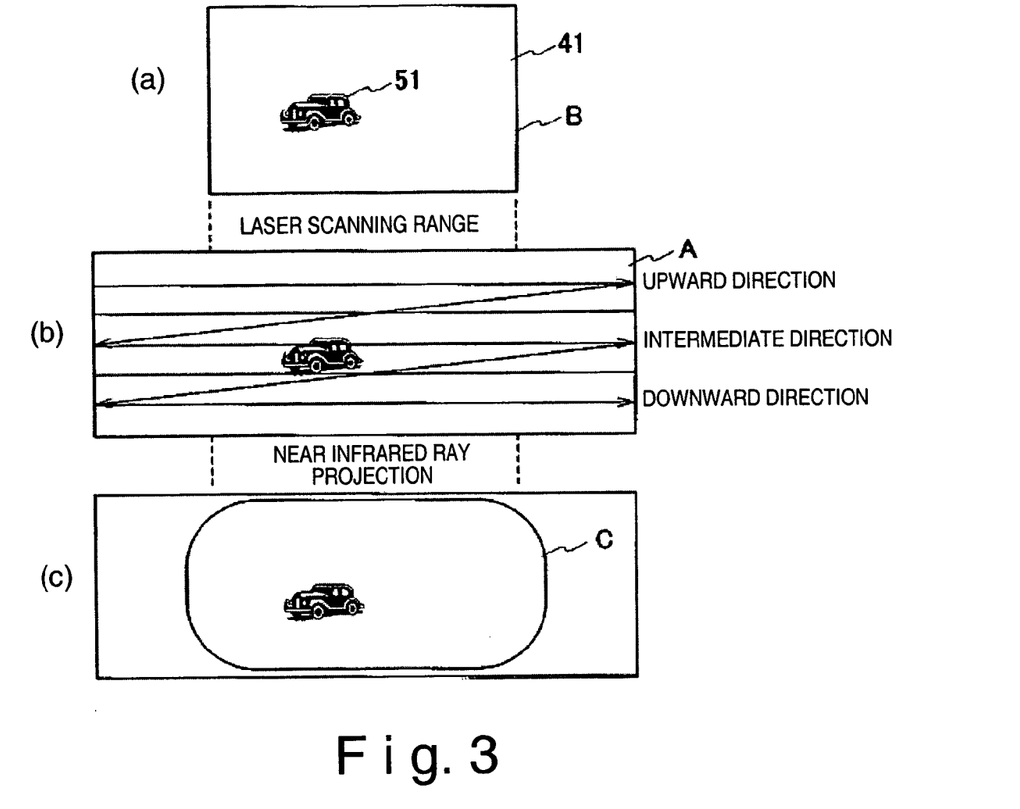
FIG. 3 is a series of diagrams (i.e., (a) an infrared image, (b) a laser beam scanning in the laser scanning range, and (c) a near infrared ray projecting range) for explaining a relation between a laser scanning range, a near infrared imaging range, and a near infrared ray projecting range in the obstacle detection apparatus in accordance with the present invention.

As shown in FIGS. 2 and 3, the obstacle detection apparatus is adapted to have settings of a laser scanning range A, a near infrared imaging range B, and a near infrared ray projecting range C. Specifically, the obstacle detection apparatus has a setting of the near infrared imaging range B for the near infrared camera 4 to take an infrared image 41 for displaying an obstacle as another vehicle 51 as shown in diagram (a) of FIG. 3. Also the obstacle detection apparatus has a setting of the near infrared ray projecting range C to project at least a near infrared ray into the range in substantially the same vertical and horizontal directions as those of the near infrared imaging range B as shown in diagram (c) of FIG. 3.

The setting of the near infrared ray projecting range C is achieved by changing the emitting angle θ2 of a laser beam emitted from the laser oscillator 21 to the near infrared ray projecting lens 11, the setting position of the near infrared ray projecting lens 11, and the optical parameter of the near infrared ray projecting lens 11, for example.

Moreover, in diagram (b) of FIG. 3, the laser scanning range A is set in such a way as to have substantially the same vertical range as the near infrared imaging range B and the near infrared ray projecting range C and to have a larger horizontal range by a given area than the near infrared imaging range B and the near infrared ray projecting range C. The setting of the laser scanning range A is achieved by a control of the laser beam emitting angle θ1 of the laser oscillator 21 made by the swivel actuator 23.

The laser scanning range A, the near infrared imaging range B, and the near infrared ray projecting range C are set as stated above, by which the near infrared ray projecting range C includes portions of the laser scanning range A and the near infrared imaging range B.

The laser scanning range A divided into a plurality of sections in the vertical direction (perpendicularly). The laser radar and near infrared ray projector 1 scans a laser beam in the horizontal direction (crosswise direction) within the laser scanning range A as shown in diagram (b) of FIG. 3. As shown in diagram (b) of FIG. 3, a situation is illustrated where a laser beam is scanned three times in the horizontal direction with the laser scanning range A divided into three sections in the vertical direction. Thereby, the electronic control unit 3 can obtain the obstacle position based on a position in the laser scanning range A where a reflected laser beam from the obstacle has been detected. In other words, it is possible to perform an obstacle detection in the upward direction within the infrared image 41, an obstacle detection in the intermediate direction within the infrared image 41, and an obstacle detection in the downward direction within the infrared image 41.

Figure 4:
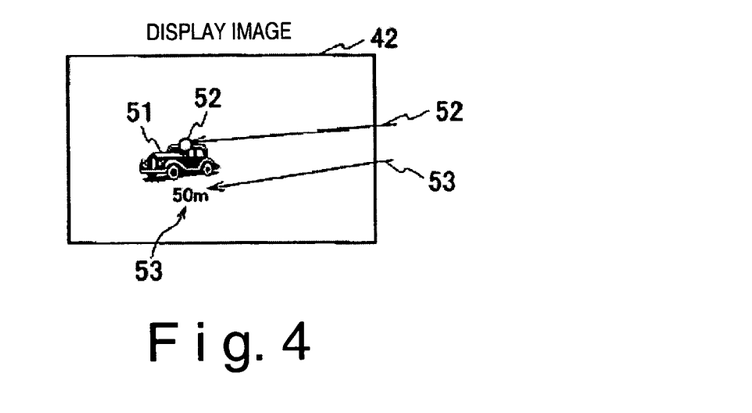
FIG. 4 is a diagram showing an example of information displayed by the obstacle detection apparatus in accordance with the present invention.

Thereby, the obstacle detection apparatus can display a display image 42 with the indication of another vehicle 51 as an obstacle, an obstacle mark 52, and the indication of a distance 53 overlapped with each other by using the graphic display unit 5, as shown in FIG. 4.

At that time, the electronic control unit 3 controls the near infrared camera 4 to acquire an infrared image at given time intervals and controls the laser radar and near infrared ray projector 1 to acquire a light receiving signal within the time period excluding the time period for taking the infrared image using the near infrared camera 4. In other words, the electronic control unit 3 operates the laser radar and near infrared ray projector 1 and the near infrared camera 4 to project the infrared ray during the time period excluding a time period for detecting a reflected laser beam at the laser receiver 22 by controlling the laser oscillator 21 to scan the laser beam, the time period being required for generating obstacle information by analyzing the light receiving signal from the laser receiver 22 at the electronic control unit 3, thereby causing the near infrared camera 4 to obtain the infrared image.

The following describes processing of controlling the timing for acquiring the infrared image in the aforementioned obstacle detection apparatus and the timing for acquiring the light receiving signal for generating the obstacle information.

Note here that the graphic display unit 5 is adapted to display also a normal video signal and therefore the image signal output to the graphic display unit 5 has to conform to the same specification as for displaying the video signal. The video signal is displayed at a given frequency with a given standardized synchronization signal. Therefore, the infrared image has to be displayed at the given frequency, too. Accordingly, the electronic control unit 3 is required to synchronize the timing for projecting the infrared ray of the laser radar and near infrared ray projector 1 and the timing for acquiring the infrared image of the near infrared camera 4 with the video signal for acquiring the infrared image.

Specifically, there are video signal systems such as the national television system committee (NTS), the phase alternation by line (PAL) system, and the sequential color and memory (SECAM) system. In any of these systems, an image is displayed at a given frequency of the system concerned. In the NTSC system, 30 frame images are continuously displayed in the period of one second and it is standardized that one frame image is composed of 525 scanning lines as a progressive system. In the NTSC system, a flicker occurs when 30 frame images are displayed per second. Therefore, it is also standardized to divide one frame image into an odd field image and an even field image and to display 60 field images per second as an interlace system.

Therefore, if an infrared image is displayed on the graphic display unit 5 in the interlace system, it is necessary to generate an image signal for displaying an odd field image and an even field image for one frame period. In other words, the graphic generation section 2 generates the image signal for displaying two infrared images at the field frequency of 60 Hz for one frame period (frame frequency: 30 Hz).

Figure 5:
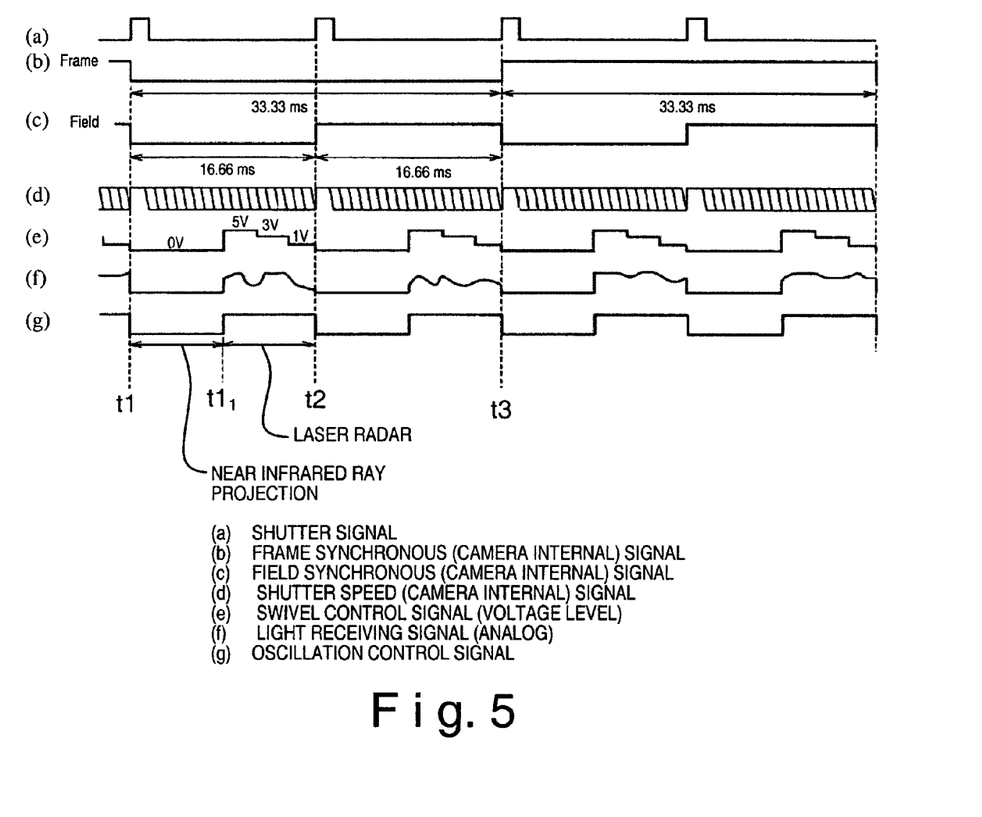
FIG. 5 is a timing chart for acquiring an infrared image and obstacle information using the obstacle detection apparatus according to the present invention, showing (a) a shutter signal of a near infrared camera, (b) a frame synchronization signal in the near infrared camera, (c) a field synchronization signal in the near infrared camera, (d) a shutter speed, (e) a swivel control signal, (f) a light receiving signal, and (g) an oscillation control signal.

On the other hand, the electronic control unit 3 supplies the obstacle information and the infrared image to the graphic generation section 2 by using the single laser oscillator 21 by controlling the near infrared camera 4, the laser oscillator 21, and the laser receiver 22 as shown in FIG. 5 to cause the graphic display unit 5 to make the display as shown in FIG. 4. The timing chart shown in FIG. 5 illustrates the operation of the obstacle detection apparatus when employing the NTSC system as the image signal system.

Referring now to FIG. 5, the electronic control unit 3 generates a shutter signal at times t1, t2, and t3 for each field period in the NTSC system and supplies the shutter signal to the near infrared camera 4 (see, line (a) of FIG. 5). Thereby, the near infrared camera 4 generates a frame synchronization signal of a 33.33-msec frame period (see, line (b) of FIG. 5) and generates a field synchronization signal of a 16.66-msec field period (see, line (c) of FIG. 5).

The near infrared camera 4 receives a near infrared ray in the near infrared imaging range B by putting the camera shutter in the open state at a given shutter speed for a given time period for each field period (see, line (b) of FIG. 5). The shutter speed and the shutter opening time of the near infrared camera 4 are arbitrarily adjusted according to light conditions or the like around the vehicle 10. Thereby, the near infrared camera 4 is ready to supply the field image signal as an infrared image to the graphic generation section 2 for each field period.

On the other hand, the electronic control unit 3 generates a swivel control signal for dividing one field period into the near infrared ray projecting period and the laser beam scanning period and controls the swivel actuator 23 accordingly. In this regard, the electronic control unit 3 inputs the swivel control signal by means of a voltage level and identifies the upward direction, the intermediate direction, and the downward direction shown in diagram (b) of FIG. 3 in the range of the laser beam emitting angle θ1 of the laser oscillator 21 according to the voltage level. Moreover, the laser beam emitting angle of the laser oscillator 21 is defined as θ2. In this embodiment, it is assumed that the swivel control signal of 0 V corresponds to the laser beam emitting angle θ2, the swivel control signal of 5 V corresponds to the laser beam emitting angle for scanning in the upward direction, the swivel control signal of 3 V corresponds to the laser beam emitting angle for scanning in the intermediate direction, and the swivel control signal of 1 V corresponds to the laser beam emitting angle for scanning in the downward direction.

Therefore, the electronic control unit 3 synchronizes the light receiving timing of the near infrared camera 4 and the projecting timing of the near infrared ray from the near infrared ray projecting lens 11 by supplying the swivel control signal with the laser beam emitting angle $\theta2$ to the swivel actuator 23 in synchronization with the shutter signal. Moreover, the electronic control unit 3 supplies the swivel control signal whose voltage level varies in such a phased manner as 5 V, 3 V, and 1 V within one field period to the swivel actuator 23 during the period excluding the projecting timing of the near infrared ray and thereby causing the scanning of the laser beams as shown in diagram (b) of FIG. 3 to acquire a light receiving signal from the swivel actuator 23. In this embodiment, the one field period is divided into substantially two periods, assuming that the first half earlier than time $t1_1$ is a period for acquiring an infrared image and that the second half later than time $t1_1$ is a period for acquiring a light receiving signal.

The electronic control unit 3 then sets the swivel control signal to 0 V at time t2 and supplies a shutter signal to the near infrared camera 4 to cause it to acquire an infrared image. Thereafter, the electronic control unit 3 analyzes the light receiving signal acquired at the time $t1_1$ to time t2, generates obstacle information, and supplies it to the graphic generation section 2 during the period for acquiring the infrared image after the time t2. Thereby, the graphic generation section 2 causes the graphic display unit 5 to display the infrared image overlapped with the obstacle information at time t3.

Although the laser receiver 22 sometimes detects a light having the same wavelength as the laser beam during the infrared image acquisition period, the light receiving of the laser receiver 22 may be canceled during the infrared image acquisition period and furthermore the electronic control unit 3 may cancel the light receiving signal.

In the processing described with reference to FIG. 5, the swivel control signal is presented by means of a voltage level. A signal type, however, other than the voltage level can be adopted to control the laser beam emitting angle of the laser oscillator 21.

Furthermore, while the oscillation control signal varies in two phases in the processing described with reference to FIG. 5, it is also possible to vary the oscillation control signal supplied from the electronic control unit 3 to the swivel actuator 23 when an oscillation output is varied according to whether a near infrared ray is projected through the near infrared ray projecting lens 11 or a laser beam is scanned through the near infrared ray transmission bandpass filter 12.

Still further, the one field period is divided into substantially two equal parts: the infrared image acquisition period and the light receiving signal acquisition period in the processing described with reference to FIG. 5. However, only if the situation satisfies the conditions that at least one frame image is acquired during one frame period and that a light receiving signal acquisition period is provided in the time period excluding the infrared image acquisition period, it is possible to change the infrared image acquisition period and the light receiving signal acquisition period, and further the light receiving signal acquisition period for each field period may be omitted. In other words, a long period may be allocated to processing requiring a longer period according to an actual system configuration or conditions.

Still further, in the aforementioned obstacle detection apparatus, the near infrared ray projecting lens 11 is secured to the near infrared ray transmission bandpass filter 12 for placement and the laser beam emitting angle of the laser oscillator 21 is changed to pass the laser beam through the near infrared ray projecting lens 11 or the near infrared ray transmission bandpass filter 12. The present invention, however, is not limited thereto. With the range of the laser beam emitting angle $\theta1$ of the laser oscillator 21, the near infrared ray projecting lens 11 may be adapted to be mechanically movable in the position and a near infrared ray may be projected into the near infrared ray projecting range C by driving and controlling the near infrared ray projecting lens 11.

As stated in detail hereinabove, according to the obstacle detection apparatus to which the present invention has been applied, an infrared ray is projected into the near infrared imaging range B by diverging a laser beam to obtain obstacle information, whereby a light source can be used both for detecting an obstacle and for acquiring an infrared image. Therefore, according to the obstacle detection apparatus, there is no need for mounting a dedicated projector such as a halogen lamp or a light emitting diode (LED), for example, for use in acquiring an infrared image using the near infrared camera 4, thereby reducing the cost for acquiring the infrared image, reducing power consumption, and further achieving a favorable layout of parts. In this regard, the wavelength region for use in a general laser radar ranges over the same near infrared wavelength region as for the wavelength region of the existing halogen lamp or LED and therefore the light source can be shared sufficiently.

Furthermore, according to the obstacle detection apparatus, the laser beam is emitted at the laser beam emitting angle $\theta2$, which is different from the laser beam emitting angle $\theta1$ of the laser beam scanned in the laser scanning range A, and diverged by the near infrared ray projecting lens 11, by which the laser beam can be projected into the near infrared ray projecting range C including the near infrared imaging range B. Thus, the light source can be used both for detecting the obstacle and for acquiring the infrared image by a simple control of changing the emitting direction of the laser oscillator 21. In this regard, the near infrared ray projecting lens 11 can be placed in a position off to the side (scanning direction) of the laser scanning range.

Still further, according to the obstacle detection apparatus, the infrared ray is projected into the range including the laser scanning range A and the near infrared imaging range B, thereby enabling an acquisition of the infrared image and obstacle information in the same range.

Still further, according to the obstacle detection apparatus, it causes a laser beam to be scanned at the laser beam emitting angle $\theta1$ and obstacle information to be calculated when detecting an obstacle and causes an infrared ray to be projected and the near infrared camera 4 to take an infrared image when acquiring the infrared image. Therefore, it is possible to acquire both of the obstacle information and the infrared image using the single laser oscillator 21.

Still further, according to the obstacle detection apparatus, the time period for scanning the laser beam at the laser beam emitting angle $\theta1$ is separated from the time period for projecting the infrared ray and taking the infrared image using the near infrared camera 4. Therefore, the acquisition of the obstacle information can be performed alongside the acquisition of the near infrared image.

Specifically, it is possible to project the infrared ray to take an infrared image for each field period t1, t2, or the like, which is a given graphic display time interval shown in FIG. 5, and to scan the laser beam during the time period within a given field period and while the infrared ray is not projected. In other words, it is possible to project an infrared ray so as to cause the near infrared camera 4 to take an infrared image during the time period while the electronic control unit 3 calculates the obstacle information and while the laser beam is not scanned.

Still further, according to the obstacle detection apparatus, the graphic display unit 5 displays the infrared image and the obstacle information acquired together, whereby the position, distance, or speed of the obstacle included in the infrared image can be additionally presented to a driver.

As used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An object detection apparatus comprising:
    a laser beam emitting device configured and arranged to emit a laser beam with a wavelength region including a near infrared ray;
    a laser beam scanning device configured and arranged to control a laser beam emitting angle of the laser beam emitting device to scan the laser beam within an object detection range; and
    an infrared ray projecting device configured and arranged to diverge the laser beam emitted from the laser beam emitting device and project the near infrared ray into an infrared imaging range.

2. The object detection apparatus according to claim 1, wherein
    the laser beam scanning device is further configured and arranged to control the laser beam emitting device to emit the laser beam at a laser beam emitting angle different from the laser beam emitting angle of the laser beam scanned in the object detection range; and
    the infrared ray projecting device includes an optical member configured and arranged to receive and diverge the laser beam when the laser beam is emitted at the laser beam emitting angle that is different from the laser beam emitting angle of the laser beam scanned in the object detection range.

3. The object detection apparatus according to claim 1, wherein
    the infrared ray projecting device is further configured and arranged to project the near infrared ray into a range at least partially including the object detection range for the laser beam scanning device and the infrared imaging range.

4. The object detection apparatus according to claim 1, further comprising
    a laser beam receiving device configured and arranged to receive a laser beam scanned by the laser beam scanning device and reflected by an object;
    an infrared imaging device configured and arranged to obtain an infrared image by receiving the near infrared ray that is projected by the infrared ray projecting device and reflected by the object; and
    a control device configured and arranged to calculate object information based on the laser beam received by the laser beam receiving device when the laser beam scanned by the laser beam scanning device detects the object, and to causes the infrared ray projecting device to project the near infrared ray and the infrared imaging device to obtain the infrared image when acquiring the infrared image.

5. The object detection apparatus according to claim 4, wherein
    the control device is further configured and arranged to control the laser beam scanning device to scan the laser beam at a given laser beam emitting angle when detecting the object, and the control device is further configured and arranged to control the laser beam scanning device to emit the laser beam at a laser beam emitting angle different from the given laser beam emitting angle and control the infrared ray projecting device to diverge the laser beam when acquiring the infrared image.

6. The object detection apparatus according to claim 4, wherein
    the control device is further configured and arranged to discriminate a time period for scanning the laser beam using the laser beam scanning device from a time period for projecting the near infrared ray using the infrared ray projecting device and obtaining the infrared image using the infrared imaging device.

7. The object detection apparatus according to claim 6, wherein
    the control device is further configured and arranged to control the infrared ray projecting device to project the near infrared ray at given graphic display time intervals and the infrared imaging device to obtain the infrared image, and the control device is further configured and arranged to control the laser beam scanning device to scan the laser beam during a time period within the given graphic display interval and while the infrared ray projecting device is not projecting any near infrared ray.

8. The object detection apparatus according to claim 6, wherein
the control device is further configured and arranged to control the infrared ray projecting device to project the near infrared ray and the infrared imaging device to obtain the infrared image during a time period while the object information is calculated and while the laser beam is not scanned.

9. The object detection apparatus according to claim 4, further comprising
a display device configured and arranged to display the infrared image taken by the infrared imaging device and the object information calculated by the control device.

10. The object detection apparatus according to claim 2, wherein
the infrared ray projecting device is further configured and arranged to project the near infrared ray into a range at least partially including the object detection range for the laser beam scanning device and the infrared imaging range.

11. A vehicle comprising the object detection apparatus according to claim 1.

12. The vehicle according to claim 11, wherein
the laser beam scanning device is further configured and arranged to control the laser beam emitting device to emit the laser beam at a laser beam emitting angle different from the laser beam emitting angle of the laser beam scanned in the object detection range; and
the infrared ray projecting device includes an optical member configured and arranged to receive and diverge the laser beam when the laser beam is emitted at the laser beam emitting angle that is different from the laser beam emitting angle of the laser beam scanned in the object detection range.

13. The vehicle according to claim 11, wherein
the infrared ray projecting device is further configured and arranged to project the near infrared ray into a range at least partially including the object detection range for the laser beam scanning device and the infrared imaging range.

14. The vehicle according to claim 11, further comprising
a laser beam receiving device configured and arranged to receive a laser beam scanned by the laser beam scanning device and reflected by an object;
an infrared imaging device configured and arranged to obtain an infrared image by receiving the near infrared ray that is projected by the infrared ray projecting device and reflected by the object; and
a control device configured and arranged to calculate object information based on the laser beam received by the laser beam receiving device when the laser beam scanned by the laser beam scanning device detects the object, and to causes the infrared ray projecting device to project the near infrared ray and the infrared imaging device to obtain the infrared image when acquiring the infrared image.

15. The vehicle according to claim 14, wherein
the control device is further configured and arranged to control the laser beam scanning device to scan the laser beam at a given laser beam emitting angle when detecting the object, and the control device is further configured and arranged to control the laser beam scanning device to emit the laser beam at a laser beam emitting angle different from the given laser beam emitting angle and control the infrared ray projecting device to diverge the laser beam when acquiring the infrared image.

16. The vehicle according to claim 14, wherein
the control device is further configured and arranged to discriminate a time period for scanning the laser beam using the laser beam scanning device from a time period for projecting the near infrared ray using the infrared ray projecting device and obtaining the infrared image using the infrared imaging device.

17. The vehicle according to claim 16, wherein
the control device is further configured and arranged to control the infrared ray projecting device to project the near infrared ray at given graphic display time intervals and the infrared imaging device to obtain the infrared image, and the control device is further configured and arranged to control the laser beam scanning device to scan the laser beam during a time period within the given graphic display interval and while the infrared ray projecting device is not projecting any near infrared ray.

18. The vehicle according to claim 16, wherein
the control device is further configured and arranged to control the infrared ray projecting device to project the near infrared ray and the infrared imaging device to obtain the infrared image during a time period while the object information is calculated and while the laser beam is not scanned.

19. The vehicle according to claim 11, further comprising
a display device configured and arranged to display the infrared image taken by the infrared imaging device and the object information calculated by the control device.

20. An object detection apparatus comprising:
laser beam emitting device means for emitting a laser beam with a wavelength region including a near infrared ray;
a laser beam scanning means for controlling a laser beam emitting angle of the laser beam emitting device to means the laser beam within an object detection range; and
an infrared ray projecting means for diverging the laser beam emitted from the laser beam emitting means and project the near infrared ray into an infrared imaging range.

* * * * *